United States Patent [19]

Puder et al.

[11] Patent Number: 5,262,200
[45] Date of Patent: Nov. 16, 1993

[54] SYSTEM AND METHOD OF APPLYING CYANOACRYLATE ADHESIVE ACTIVATOR

[76] Inventors: Alan Puder, 1775 Eleanor Ave.; Carl Sims, 1136 Colette Pl., both of St. Paul, Minn. 55116

[21] Appl. No.: 859,144

[22] Filed: Mar. 27, 1992

[51] Int. Cl.⁵ .......................... B05D 5/10; B05D 3/10
[52] U.S. Cl. ................... 427/302; 427/208.8; 427/260
[58] Field of Search ............ 427/303, 208.8, 429, 427/143, 260, 302

[56] References Cited

U.S. PATENT DOCUMENTS

| | | | |
|---|---|---|---|
| 4,042,442 | 8/1977 | Dombroski et al. | 427/302 |
| 4,215,173 | 7/1980 | Hubbard | 427/208.8 |
| 4,364,876 | 12/1982 | Kimura | 558/443 |
| 4,477,557 | 10/1984 | Rauch | 427/143 |
| 4,687,827 | 8/1987 | Russo | 427/429 |
| 4,702,783 | 10/1987 | Mason | 156/64 |
| 4,798,720 | 1/1989 | Holder | 106/3 |

FOREIGN PATENT DOCUMENTS 123434 10/1978 Japan ............................ 427/260

*Primary Examiner*—Shrive Beck
*Assistant Examiner*—Diana Dudash
*Attorney, Agent, or Firm*—Patterson & Keough

[57] ABSTRACT

An apparatus for application of controlled amounts of cyanoacrylate adhesive catalyst solution to a substrate is disclosed. The apparatus includes an absorbent, wicking material that is permeated with catalyst solution. By contacting the permeated wicking material with the substrate, controlled amounts of catalyst solution may be applied to delimited areas of the substrate. The apparatus, which may have a configuration similar to that of a felt tip marking pen, allows convenient use of low-volatility solvents in the catalyst solution. Also disclosed is a method for application of catalyst solution and cyanoacrylate adhesive to a substrate. A dye or other colorimetric substance may be added to the catalyst solution to allow for visualization of the amount and location of catalyst solution on the substrate.

3 Claims, 1 Drawing Sheet

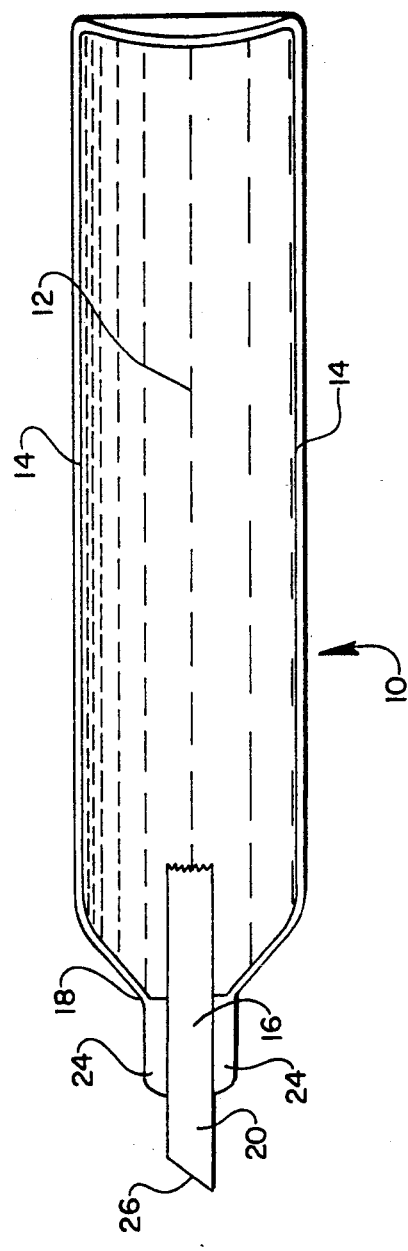

SYSTEM AND METHOD OF APPLYING CYANOACRYLATE ADHESIVE ACTIVATOR

FIELD OF THE INVENTION

This invention relates to technology for application of cyanoacrylate adhesives to substrates bondable with such adhesives. In particular, the invention relates to a system and method for application of cyanoacrylate adhesives and catalysts in selected amounts to delimited areas of substrates.

BACKGROUND OF THE INVENTION

Cyanoacrylate-based adhesives have been found useful in a wide array of industrial and domestic applications involving bonding of two or more objects. When used in conjunction with catalysts such as aromatic amines that accelerate the anionic polymerization process and resultant curing of the adhesive, the cyanoacrylate-based adhesives are noted for high bonding strength, rapidity of curing and durability. These qualities have made cyanoacrylate-based adhesives the adhesives of choice in such diverse applications as assembly of electrical and computer components, assembly of model airplanes, ships and like objects by hobbyists, and attachment of silk screens to frames in the silk screen printing industry.

The adhesive-based attachment of silk screens to frames is illustrative of the advantages and disadvantages of prior art adhesive compositions and methods of application. In the silk screen serigraphic printing process, various colored inks or dyes are transferred through a pattern of openings or holes in a screen fabric onto an object to be printed. The pattern of openings may be fashioned by selectively blocking or occluding a desired array of openings in the screen fabric, leaving a pattern of unoccluded openings representing the selected print design. The movement of ink or dye through the openings onto the printed substrate creates a printed design on the substrate that duplicates the pattern of unoccluded openings in the screen fabric.

In order to provide an accurate and reproducible transfer of ink through the screen fabric onto the printed substrate, it is necessary for the screen fabric material to be in a taut configuration. As such, the screen material is generally stretched by securing the periphery of the material to a frame structure. The frame can be of any desired shape, but is frequently manufactured so as to maintain the screen fabric in a planar configuration. In a common configuration, the frame structure provides a square or rectangular configuration similar to that of a typical picture frame, although with additional rigid supporting structure beneath the screen-engaging portion of the frame. The screen fabric is bonded or otherwise attached to the periphery of the screen-engaging portion of the frame such that uniform tension is applied to the fabric in the planar dimension. That is, tension is applied in directions corresponding to the four sides of the frame as described above.

In addition to the commonly used screen printing fabrics, a variety of other fabrics may be employed for screen printing, including without limitation polyesters, nylons, stainless steel, cotton and similar screened materials. Depending on the desired application the fabrics may possess various mesh sizes and densities, i.e., may possess various sizes of openings as well as various densities of openings per unit area.

Typically, the screen fabric in taut condition is contacted with the screen-engaging peripheral structure of the frame. Next, the fabric is bonded to the frame, with the goal being duplication and maintenance of the original taut condition. With older wooden frames, it was possible to staple the fabric to the frame. With modern frames manufactured of metal or other non-wooden materials, staple attachment is not an option. Consequently, adhesive bonds became widely used as non-wooden frames entered the industry. For purposes of bonding, a common practice has been to apply, from a squeeze-type bottle for example, a selected quantity of cyanoacrylate-based adhesive to that portion of the screen in contact with the peripheral screen-engaging portion of the frame. The adhesive is spread out with a card or other suitable spreader to ensure proper contact of the adhesive with all portions of the fabric in contact with the frame. Although the cyanoacrylate-based adhesive will slowly cure upon contact with the moisture content of air, the curing process (anionic polymerization) generally is accelerated with a catalyst. The catalyst is generally a basic chemical compound, and aromatic amines have proven particularly useful as efficient catalysts.

Various alkyl-substituted cyanoacrylate adhesives have been used in the screen printing industry. The nature of the alkyl group influences the viscosity, bonding and other characteristics of the adhesive. For example, methylcyanoacrylates generally exhibit a low viscosity suited for screen fabrics having a relatively small mesh size. Ethylcyanoacrylates generally display a higher viscosity than the methylcyanoacrylates and are therefore more suited to screen fabrics of somewhat larger mesh size. Since it is often desirable to re-use the frame for a succession of printing jobs, it is desirable to form an adhesive bond that allows the screen fabric to be peeled away from the frame while at the same time providing relatively high sheer strength in order that the fabric remains appropriately taut in use. Isopropylcyanoacrylates, which display even greater viscosities than the ethylcyanoacrylates, and are appropriate for applications requiring a bond of particularly high peel strength. This may be necessary, for example, when printing occurs in particularly close proximity to the edge of the screen fabric.

Following application of the cyanoacrylate adhesive, the catalyst is applied, generally as a solute in a solvent carrier. In one commonly used method of application, as disclosed for example in U.S. Pat. No. 4,702,783, an aromatic amine catalyst is applied as a spray or freon-propelled aerosol directed at those portions of the screen and underlying frame to which the cyanoacrylate adhesive has been applied. The goal of such application is provision of a light coat of the spray catalyst so as to provide a satisfactorily polymerized bond in 30 seconds or less. The amount of catalyst applied may need to be varied depending on the amount of cyanoacrylate adhesive previously applied to the substrate and the temperature of the catalyst solution and substrate.

A problem with cyanoacrylate adhesives is that such adhesives typically are clear in appearance. As such, it is frequently difficult to ascertain both the precise amount of adhesive applied as well as the precise boundaries of the adhesive-coated regions of the substrate. Similarly, the catalyst solution also may be clear in appearance, such that it may be difficult to monitor the amount of catalyst solution applied during the application process and to ensure confinement of the catalyst solution to desired areas of substrate. This is particularly true for propelled aerosol application of catalyst solution.

If an excess amount of adhesive is applied to the substrate, if the spreading of the adhesive is uneven, or if an excess amount of catalyst solution is applied, all or parts of the bond may be defective due to entrapment of solvent in the cured adhesive. Typically such a bond has a whitish filmy appearance, and such "blushing effect" or "blooming effect" is frequently perceived as evidence of a failed bond. Conversely, application of insufficient adhesive or catalyst also may result in defective bonds. One approach to the problem of a clear-appearing adhesive compound has involved addition of various dyes to the adhesive, as exemplified in U.S. Pat. No. 4,702,783. This allows for visual estimation of the amount and location of cyanoacrylate adhesive. In addition, catalysts are often dissolved in highly volatile solvents (for example, solvents with boiling points of approximately 100° C. or less) with the intent that the solvent is able to evaporate before becoming entrapped in the polymerizing adhesive. On the other hand, highly volatile solvents may chemically diffuse into the cyanoacrylate adhesive with adverse effects on the bonding characteristics Unfortunately, the catalyst solutions as employed in the art have had less than optimum properties in regard to environmental and health concerns. Volatile organic solvents (for example, solvents which at room temperature exhibit vapor pressures greater than approximately 50 mm Hg) may have a variety of toxic effects when inhaled or when brought into skin contact. This is especially so when catalyst solutions are applied as aerosols, which may expose industry workers not only to volatilized solvents but also to volatilized catalyst compounds which themselves may have adverse health consequences. Previous industrial methods of application of catalyst solution may also have adverse environmental effects. Industrial or domestic use of volatile organic solvents of course leads to release of such solvents into the atmosphere. In addition, use of trichloroethylenes or of fluorocarbons (e.g., freon) as aerosol propellants may contribute to destruction of atmospheric ozone.

Accordingly, it would be useful to provide means for applying effective and controlled amounts of catalyst solution in which the catalyst is dissolved in a biodegradable, low-volatility solvent. To the extent that such means allow for precise delivery of controlled amounts of catalyst solution to defined, or delimited, areas of substrate, such means would prove useful even with volatile solvents.

SUMMARY OF THE INVENTION

The apparatus and method of the present invention provide a means for delivering precise amounts of catalyst solution to precisely defined areas of a substrate bondable with cyanoacrylate adhesive.

The apparatus of the present invention comprises an applicator for application of a layer of catalyst solution to a delimited portion of a substrate. The applicator includes wicking means allowing for controlled transfer of the catalyst solution from the applicator to the selected delimited portion of the substrate. The applicator may have an over-all configuration similar to that of a felt-tip marking pen. That is, the applicator may include a container for housing the catalyst solution within at least one chamber defined by the walls of the container. In this marking pen embodiment, the wicking means is in fluid communication with the chamber or chambers of the container, and may comprise a felt tip coupled to the container. The catalyst solution comprises a catalyst for accelerating polymerization of a cyanoacrylate adhesive, plus a solvent in which the catalyst is dissolved. Preferably the solvent is a low-volatility solvent, e.g., one with a vapor pressure lower than approximately 1.0 mm Hg at room temperature. The catalyst solution may include a dye or other colorimetric indicator for visualizing the catalyst solution upon transfer to the substrate.

The invention further comprises a method for applying cyanoacrylate adhesive and a chemical catalyst solution to a substrate bondable with the adhesive. The method includes contacting a wicking material with the catalyst solution such that the wicking material becomes permeated with the catalyst solution, applying a layer of the catalyst solution to the substrate by contacting the permeated wicking material with the substrate, and applying cyanocacrylate adhesive to a portion of the substrate substantially overlapping with that portion of the substrate receiving the catalyst solution. The catalyst solution includes a catalyst dissolved in a solvent. Preferably the solvent is a low-volatility organic solvent. In a preferred embodiment the catalyst solution is applied to the substrate prior to application of the cyanoacrylate adhesive.

The method of the present invention is applicable to a wide range of industrial and domestic uses. For example, the method may be used in the screen printing industry to bond a meshed screen fabric to the peripheral surface of a screen frame structure. The method also has utility in the electrical and computer industries for application of adhesives to the surfaces of various electrical or other components. Likewise, the method is applicable to assembly of airplane and the like models by hobbyists.

The cyanoacrylate adhesive may be any of the alkyl-substituted cyanoacrylates, preferably methylcyanoacrylate, ethylcyanoacrylate, isopropylcyanoacrylate or isobutylcyanoacrylate. The catalyst may be any of the dialkyl-substituted aromatic amines, preferably N,N-dimethylparatoluidine or N,N-diisopropylparatoluidine. The catalyst may comprise 0.05% to 1.0% by volume of the catalyst solution, preferably 0.125% to 0.25% by volume of the catalyst solution. The solvent may be a water-soluble or water-insoluble glycol ether, preferably dipropylene glycol monobutyl ether. The catalyst solution may include a dye or other colorimetric substance for visualizing the layer of catalyst solution on the substrate.

BRIEF DESCRIPTION OF THE DRAWING

FIG. 1 is a longitudinal, sectional view of a preferred embodiment of the present invention.

DETAILED DESCRIPTION

Applicants have unexpectedly found that an appropriate absorbent or wicking material used as an applicator for administering catalyst solution solves many of the problems encountered in the prior art. Precise control of applied catalyst amounts is even more critical with low-volatility solvents than with high-volatility solvents. This is because the low-volatility solvent does not rapidly evaporate and so is more readily trapped in the adhesive during polymerization. Nevertheless, low-volatility solvents are desirable as carriers for cyanoacrylate adhesive catalysts for the environmental and health reasons discussed above. The method and apparatus of the present invention allows convenient use of low-volatility solvents in catalyst solutions.

The apparatus of the present invention comprises a novel applicator for administration of catalyst solution to a substrate. The applicator 10 includes a reservoir or fluid chamber for confining the catalyst solution in fluid communication with an absorbent, wicking material such as cotton or felt. In a preferred embodiment the applicator has the configuration of a felt-tip marking pen. It is to be understood, however, that a shaped tip composed of cotton or like absorbent material may be substituted for the felt tip of such an applicator. The applicator may be of any convenient size adapted for a desired use.

In the felt tip-marker configuration as depicted in FIG. 1, catalyst solution is confined in a fluid chamber 12 defined by a cylindrical housing 14 and is in controlled fluid communication with the felt tip 16. Fluid communication between the fluid chamber 12 and the felt tip 16 is accomplished by placement of the felt tip 16 at the top 18 of the cylindrical housing 14. The distal portion 20 of the felt tip 16 extends outward from the top 18 of the cylindrical housing 14 and is in contact with the atmosphere. The proximal portion 22 of the felt tip 16 extends inward from the top 18 of the cylindrical housing 14 into the fluid chamber 12 and is in fluid contact with the catalyst solution.

By wicking action, catalyst solution is brought from the proximal portion 22 of the felt tip 16 to the distal portion 20 of the felt tip 16 at a rate dependent upon the tightness of the felt tip weave and on the constriction imposed by that portion 24 of the cylindrical housing 14 in contact with the felt tip 16. As such, catalyst solution is made available at the distal tip 26 of the felt tip 16 for application to a substrate. The rate of transfer of catalyst solution from the felt tip 16 to the substrate is controllable not only by the rate of transfer from the proximal portion 22 to the distal portion 20 as described above, but also by the pressure exerted on the felt tip 16 as it is pressed onto the substrate by the operator. As such, an operator may accomplish precise control of the amount of catalyst solution applied to various areas of the substrate. In addition, the shaped felt tip 16 allows the operator to apply catalyst solution to precisely defined, or delimited, areas of the substrate.

Relatively large cylindrical housings and absorbent materials may be used in circumstances where it is desired to apply adhesive bonds over large areas of substrate, for example in the screen printing industry. Conversely, very fine felt tips or like applicator tips may be used in circumstances where it is desired to apply adhesive bonds to very small areas of substrate, such as in the electronics and computer industries and in the hobbyist industry for assembly of model airplanes and like uses.

In an alternative embodiment, the applicator may consist simply of the appropriate shaped wicking material coupled to a convenient holder such as a plastic tube or other suitable holder. In this embodiment, the catalyst solution may be kept in a stock container separate from the applicator, with the wicking material wetted with catalyst solution from the stock container at appropriate intervals.

In a further alternative embodiment, a dye or other colorimetric indicator substance may be added to the catalyst solution. This allows even greater control by the operator over the amount and placement of catalyst solution applied to the substrate. Thus, the intensity of color on the substrate provides a relative estimate of the amount of catalyst solution transferred from the applicator tip to the substrate. Likewise, the boundaries of the colored areas on the substrate provide a precise indication of the delimited areas of the substrate that have been covered by catalyst solution.

Applicants have discovered that the above-described applicator device provides marked improvement over the prior art in formation of cyanoacrylate adhesive bonds for the screen printing process. It is relatively simple and efficient to use biodegradable low-volatility solvents in the screen printing industry with the applicator of the present invention. With such solvents, it is critical to apply the catalyst solution as a very small amount of solvent, i.e., as a virtually "dry" or very thin coating of catalyst on the substrate.

The catalyst solution is applied with the felt tip marker embodiment as described above to the screen fabric overlying the screen-engaging peripheral structure of the frame. The solvent portion of the catalyst solution is preferably a biodegradable, low flammability, low-volatility solvent. Many of the glycol ethers are appropriate as solvents in the applicators and methods of the present invention. Although both water soluble and water-insoluble glycol ethers are suitable solvents, water-insoluble glycol ethers are preferred since trapping of water in the polymerizing cyanoacrylate adhesive can contribute to a blushing effect. Most preferably the solvent is dipropylene glycol monobutyl ether. It is to be understood that solvents other than glycol ethers are also usable with the applicators and methods described herein without departing from the spirit of the present invention. A green dye or other colorimetric indicator may be incorporated into the catalyst solution to allow monitoring of the amount and location of the catalyst solution as it is applied to the substrate.

The catalyst may consist of any of the widely used aromatic amines known to those skilled in the art. Preferably the catalyst is a dialkyl-substituted aromatic amine, and more preferably the catalyst is N,N-dimethylparatoluidine or N,N-diisopropylparatoluidine.

It is noteworthy that in the present method of application, the catalyst solution is applied prior to application of the cyanoacrylate adhesive. This reverses the usual order of application ordinarily encountered in the prior art. Applicants have discovered that the applied catalyst solution as described above may be left in place for hours or even days prior to application of the cyanoacrylate adhesive. This is very useful for planning purposes such as job prioritization and will have additional utility for automation of the methods.

Having coated a delimited region of the substrate, the cyanoacrylate adhesive compound may be applied in any convenient manner. The adhesive may be any of the alkyl-substituted cyanoacrylates known to those skilled in the art. Preferably the cyanoacrylate adhesive is methylcyanoacrylate, ethylcyanoacrylate, isopropylcyanoacrylate or isobutylcyanoacrylate. A squeeze-type bottle of adhesive, for example, may be used to apply a longitudinal ridge of adhesive compound to the delimited area of the substrate. A card or other suitable spreader is used to spread out the cyanoacrylate such that most or all of the area coated with catalyst solution is covered with adhesive. The boundaries of this delimited area of substrate are readily discerned if a dye or other colorimetric compound has been incorporated into the catalyst solution as described above. Thus, it is not necessary, although it is not prohibited, to incorporate a dye into the cyanoacrylate adhesive.

The rate of hardening, or polymerization, of adhesive can be controlled by varying the concentration of catalyst in the catalyst solution. For example, with a catalyst solution consisting of a typical aromatic amine catalyst in a glycol ether solvent, applied to an alkyl-substituted cyanoacrylate adhesive, the catalyst should comprise approximately 0.05% to 1.0% of the catalyst solution on a volume per volume basis. More preferably the catalyst comprises 0.125% to 0.25% by volume of the catalyst solution. Applicants have found that a catalyst solution consisting of 0.125% by volume of catalyst applied as described above engenders an approximate 1.5-minute interval from contact with adhesive to completion of polymerization or hardening. Conversely, a catalyst solution consisting of 0.25% by volume of catalyst engenders an approximate 15 second interval to completion of hardening.

In the present method of application, it has been found that the presence of catalyst solution in the screen fabric (or in any other porous substrate such as balsa wood) creates a wicking effect that pulls the cyanoacrylate adhesive into the substrate and creates a more complete physical association of the catalyst and adhesive than has been seen with prior art methods. The bond thus formed has been found to exhibit high sheer strength but to allow peeling away of the screen fabric with only a very small amount of residue left on the frame. This greatly simplifies procedures for re-using the frame with other screen fabrics. In the commonly used prior art methods, application of catalyst solution to a previously applied layer of adhesive can create a surface polymerization effect that prevents the catalyst from interacting with sub-surface portions of the adhesive. The result of such incomplete polymerization is a less-than-optimal bond which is avoided by the method of the present invention.

Although the applicator apparatus of the present invention is preferably used to apply catalyst solution as described above, it is to be understood that the advantages inherent in the applicator will manifest themselves even if used with a volatile solvent and even if used to apply catalyst solution to a previously applied layer of adhesive. For example, if used with a volatile solvent, the applicator nevertheless allows a more precise delivery of catalyst solution than is possible with aerosol-based methods. Consequently, less catalyst solution is required to cover a given area of substrate than is required with spray or aerosol methods of application, and less solvent is released to the environment. Likewise, if the applicator is used to apply catalyst solution to a previously applied layer of adhesive, the more precise and controlled delivery of catalyst solution with the applicator of the present invention again presents precision and efficiency advantages over prior art methods such as aerosol delivery.

The foregoing detailed description has been provided for a better understanding of the invention only and no unnecessary limitation should be understood therefrom as some modifications will be apparent to those skilled in the art without deviating from the spirit and scope of the appended claims.

What is claimed is:

1. A method for applying a cyanoacrylate adhesive and a chemical catalyst solution to a substrate, comprising the steps of:
   (a) providing a substrate bondable with said adhesive;
   (b) contacting a wicking material of an applicator with said catalyst solution under conditions sufficient to permeate said wicking material with said catalyst solution, wherein said catalyst solution comprises a catalyst and a low volatility organic solvent, said catalyst being soluble in said low volatility solvent; said low volatility solvent being a glycol ether;
   (c) applying a layer of said catalyst solution to a delimited portion of said substrate by contacting said permeated wicking material with said substrate; and
   (d) then applying said cyanoacrylate adhesive to said substrate in an area generally overlapping with said catalyst solution-delimited portion of said substrate.

2. The method of claim 1, wherein said solvent is a water-insoluble glycol ether.

3. The method of claim 2, wherein said solvent is dipropylene glycol monobutyl ether.

* * * * *